United States Patent [19]

Pruvot

[11] 3,748,859

[45] July 31, 1973

[54] REFEED AND DISCHARGE SYSTEMS OF HYDRAULIC CIRCUITS OF HYDROSTATIC TRANSMISSIONS

[75] Inventor: François C. Pruvot, Billancourt, France

[73] Assignee: Regie Nationale Des Usines Renault, Billancourt (Hauts de Seine), France

[22] Filed: Feb. 8, 1972

[21] Appl. No.: 224,553

[30] Foreign Application Priority Data
Feb. 23, 1971 France .............................. 7106089

[52] U.S. Cl. ........................ 60/464, 60/488, 60/490
[51] Int. Cl. ............................................ F16h 39/02
[58] Field of Search .................... 60/53 R, 464, 488, 60/490; 139/101, 115

[56] References Cited
UNITED STATES PATENTS

| | | | |
|---|---|---|---|
| 2,961,829 | 11/1960 | Weisenbach | 60/53 R |
| 3,060,953 | 10/1962 | Harbidge | 60/53 X |
| 3,214,911 | 11/1965 | Kempson | 60/53 R |
| 3,625,007 | 12/1971 | Herndon | 60/53 R X |

*Primary Examiner*—Edgar I. Geoghegan
*Attorney*—Richard K. Stevens, Davidson C. Miller et al.

[57] ABSTRACT

A device for refeeding and discharging the hydraulic circuits of a hydrostatic transmission in which the chambers disposed at the ends of a main bore connected to a compensating pump form with said bore two shoulders constituting the seats of refeed and discharge valves comprising each a flange adapted to engage in a fluid-tight manner one of the shoulders, the refeed valves comprising furthermore first and second bores interconnecting the two ends of the valves, the first bore having a greater diameter and opening towards the main bore, each discharge valve being disposed coaxially in the refeed valve and engaging the respective seat.

8 Claims, 3 Drawing Figures

3,748,859

REFEED AND DISCHARGE SYSTEMS OF HYDRAULIC CIRCUITS OF HYDROSTATIC TRANSMISSIONS

The present invention relates in general to means for refeeding and discharging hydraulic circuits of hydrostatic transmissions, and has specific reference to an improved device of this character.

The component elements ensuring a proper operation of a hydrostatic transmission comprise in most instances a compensating pump, discharge or relief valves and refeeding valves. Their functions are as follows:

Compensating valves prevent the cavitation in the main hydraulic circuit comprising as a rule a variable-capacity pump supplying hydraulic fluid to one or more hydraulic motors ;

Discharge or relief valves protect the system against overloads while limiting the hydraulic pressure to the preset or rated relief pressure of these valves, and Refeed valves re-introduce hydraulic fluid into the main circuit branch line not connected to the high-pressure side. Since this fluid is delivered by the compensating pump the effect of internal leakages in the main component elements of the hydrostatic transmisson is compensated.

Now the present invention is concerned more particularly with a device comprising the above-defined discharge and refeed valves.

Hydrostatic transmissions are already known wherein a variable-capacity pump and a hydraulic motor are attended during their operation by leakages of hydraulic fluid, the leakage fluid being collected in a reservoir. A secondary circuit comprising essentially a compensating pump with a pressure limiting device has refeed valves inserted therein which are connected to the two branch lines of the main circuit of the hydrostatic transmission.

As a rule, these refeed valves consist of non-return valves known per se. These valves remain closed as long as the line in which they are inserted is connected to the high-pressure side of the circuit.

The opening of these refeed valves permits the creation of a pressure equal to the compensating pressure in the branch line of the main circuit which is not exposed to said high pressure.

When a vehicle equipped with a hydrostatic transmission is retarded or decelerated, the hydraulic pressure rises in the main circuit and may thus attain unduly high values. This inconvenience is currently coped with by providing two discharge valves connected to the high-pressure and low-pressure lines of the main circuit, respectively. These discharge valves are preset to open at a given pressure calculated by bearing in mind the maximum pressure which the various component elements of the hydrostatic transmission can withstand. Now since in some instances the output side of these valves is connected to the reservoir, when a discharge valve is operated there is a great likelihood that the whole of the variable-capacity pump output is delivered to this reservoir. Obviously, this arrangement requires the use of a compensating pump of considerable volumetric capacity, for this pump must be capable of refilling the main circuit. In this case the volumetric capacity of the compensating pump must be greater than that of the variable-capacity pump.

To avoid this inconvenience the fluid escaping through the discharge valve may be directed towards the refeed valves which transfer it in turn to the main circuit line in which a low pressure prevails. In this case, only the internal leakages are compensated by the compensating pump. Therefore, its volumetric capacity may be considerably smaller than that contemplated in the preceding case.

The aforesaid circuit pattern is preferred in general and adapted to return to the main circuit hydraulic fluid having previously been more or less heated by flowing through the discharge valve.

This fluid — as a rule oil — and the members through which it flows may thus attain considerable temperature values. Under these conditions, special means must be implemented for avoiding any overheating.

In a known self-contained or unitary arrangement the two refeed valves are arranged independently of each other in the casing portion disposed between the pump and the motor. These refeed valves consist of non-return ball valves and the two discharge valves are replaced by a monitored valve incorporating a way selector.

This way selector is adapted, under the highest pressure prevailing in the main circuit, to feed two chambers bound by the ends of a monitored slide or spool valve. The first chamber is fed through a gauged orifice and communicates with the single monitor discharge valve connected to the reservoir. The gauged pressure of the monitor discharge valve is adjustable by means of a screw. Moreover, a spring disposed in the first chamber constantly urges the slide or spool valve to a position such that in case of zero pressure in the valve chambers two grooves connected to the main lines, respectively, are isolated. If the pressure in one of these main lines exceeds the gauged pressure of the single discharge valve the movement of the spool valve will permit the fluid flow from one line to the other.

Now this equipment is both expensive and cumbersome due to the large number of component elements involved.

It is also known that the response time of monitored valves is relatively long. In this case a sudden, short pressure increment in the transmission is not necessarily attended by the opening of the discharge valve. As a result, the hydraulic as well as the mechanical component elements of the hydrostatic transmissions are subjected to severe stress. Finally, this equipment cannot operate with different discharge pressures in the various circuit lines.

The above-mentioned inconveniences are avoided by the present invention which relates to direct-action discharge valves having extremely short response times in order to avoid overloads likely to occur with monitored valves.

The scope of this invention is to provide :

A discharge valve of which the opening pressure varies but slightly as a function with the fluid output flowing therethrough ;

A differential discharge valve comprising a valve seat and a spring urging the movable valve member against this seat ;

A device comprising a pair of discharge valves urged by a common spring to their seated position but adapted to operate under different, adjustable pressures ;

Another device comprising refeed valves associated with said discharge valves and adapted to be incorporated in the cover of a hydraulic pump or motor.

The self-contained or unitary device according to this invention comprises a pair of discharge valves, a pair of valves for refeeding the hydraulic circuit of a hydrostatic transmission and a pair of ports connected to the main lines of the transmission which open into fluid chambers communicating with said refeed valves, respectively, this device being characterized in that the fluid chambers disposed at te opposite ends of a main bore connected to a compensating pump consiitute with said bore a pair of shoulders engageable by said refeeding valves, each refeed valve comprising a seat-forming flange engaging one of said shoulders, said refeed valves further comprising axially aligned first and second bores interconnecting the ends of said valves, the first bore of greater diameter than the second bore having its opening directed towards said main bore, at least one radial passage being further provided for connecting said first bore to the outer surface of a sliding member guiding said refeed valve in said main bore; each one of said discharge valves, disposed coaxially within said refeed valves, engaging a seat consisting of the intersection edge formed between said first and second bores, and being urged against said seat by a common spring disposed between said discharge valve, stop means limiting the axial movements of said discharge valves in the closing direction thereof whereby when one of said discharge valves is seated under the force of said common spring the refeed valve is moved away from the corresponding shoulder and the radial passage is closed by said main bore.

Other features and advantages of this invention will appear as the following description proceeds with reference to the accompanying drawing illustrating diagrammatically by way of example a typical form of embodiment of the valve assembly according to this invention. In the drawing.

Figure 1:
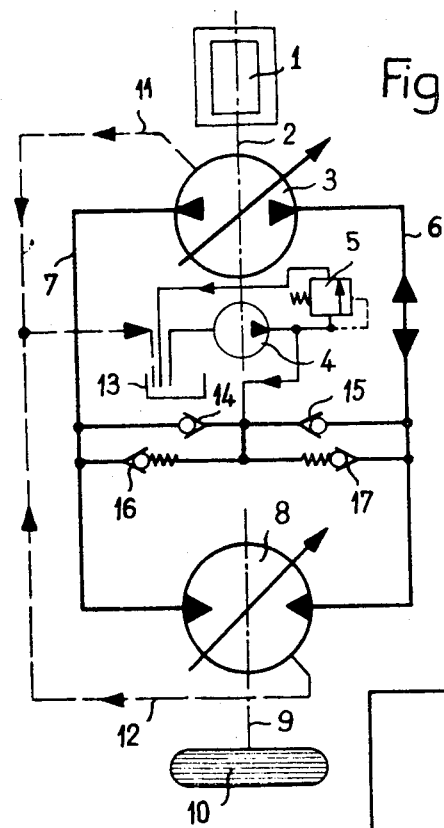
FIG. 1 is a diagrammatic illustraiion of a conventional hydrostatic transmission.

The conventional hydrostatic transmisson illustrated in FIG. 1 comprises a thermal engine 1 having its output shaft 2 drivingly connected to a variable-capacity pump 3 and also to a compensating pump 4. The output pressure of this compensating pump 4 is limited by a discharge or relief valve 5. The variable-capacity pump 3 is adapted to feed via pipe lines 6 and 7 a hydraulic motor 8 driving through its output shaft 9 a load 10 consisting for example of one or a plurality of drive wheels of a vehicle.

Theoretically, the circuit comprising the pump 3, motor 8 and pipe lines 6 and 7 should be adapted to be filled once and forever. In fact, this is not possible for many reasons, one of which being that the motor 8 and the pump 3 have internal leakages shown diagrammatically by the dash lines 11 and 12, these leakages depending notably on pressure and also on the driving speed of the vehicle. Since the liquid from these leakages 11 and 12 is constantly directed towards the reservoir 13, the main circuit is drained after a relatively short time period. To refill the main circuit the compensating pump 4 is used. The pressure of this pump 4 is generally of the order of 30 to 200 psi, according to applications, and its output is directed to a pair of refeed valves 14, 15 connected to lines 7 and 6, respectively. These refeed valves 14, 15 are closed when the conduit to which they are connected is subjected to the high hydraulic pressure, thus permitting building up a pressure for compensating the pressure drop produced by leakages in the other conduit.

To avoid an unduly strong increment in the main circuit pressure, a pair of discharge valves 16 and 17 connected to the main lines 6 and 7 are used. These discharge valves are preset to open at a pressure calculated by bearing in mind the maximum pressure which the various component elements of the hydrostatic transmission can withstand.

Since the fluid escaping from the discharge valves is directed to the refeeding valves which direct this fluid in turn to the low-pressure conduit, the compensating pump must be capable of making up the fluid lost as a consequence of leakages in the transmission.

Figure 2:
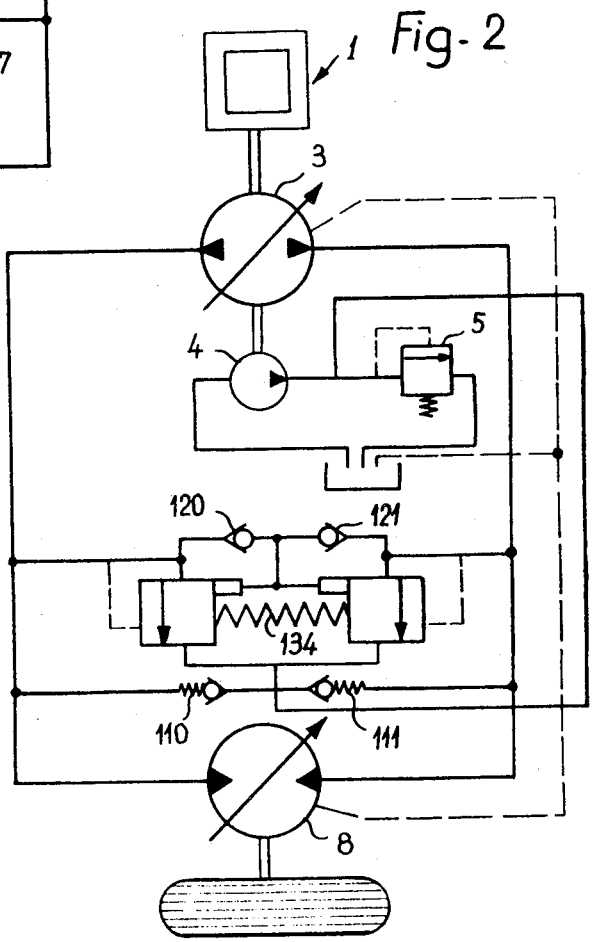
FIG. 2 is a diagrammatic illustration of a hyrostatic transmission incorporating the valve assembly according to this invention.
Figure 3:
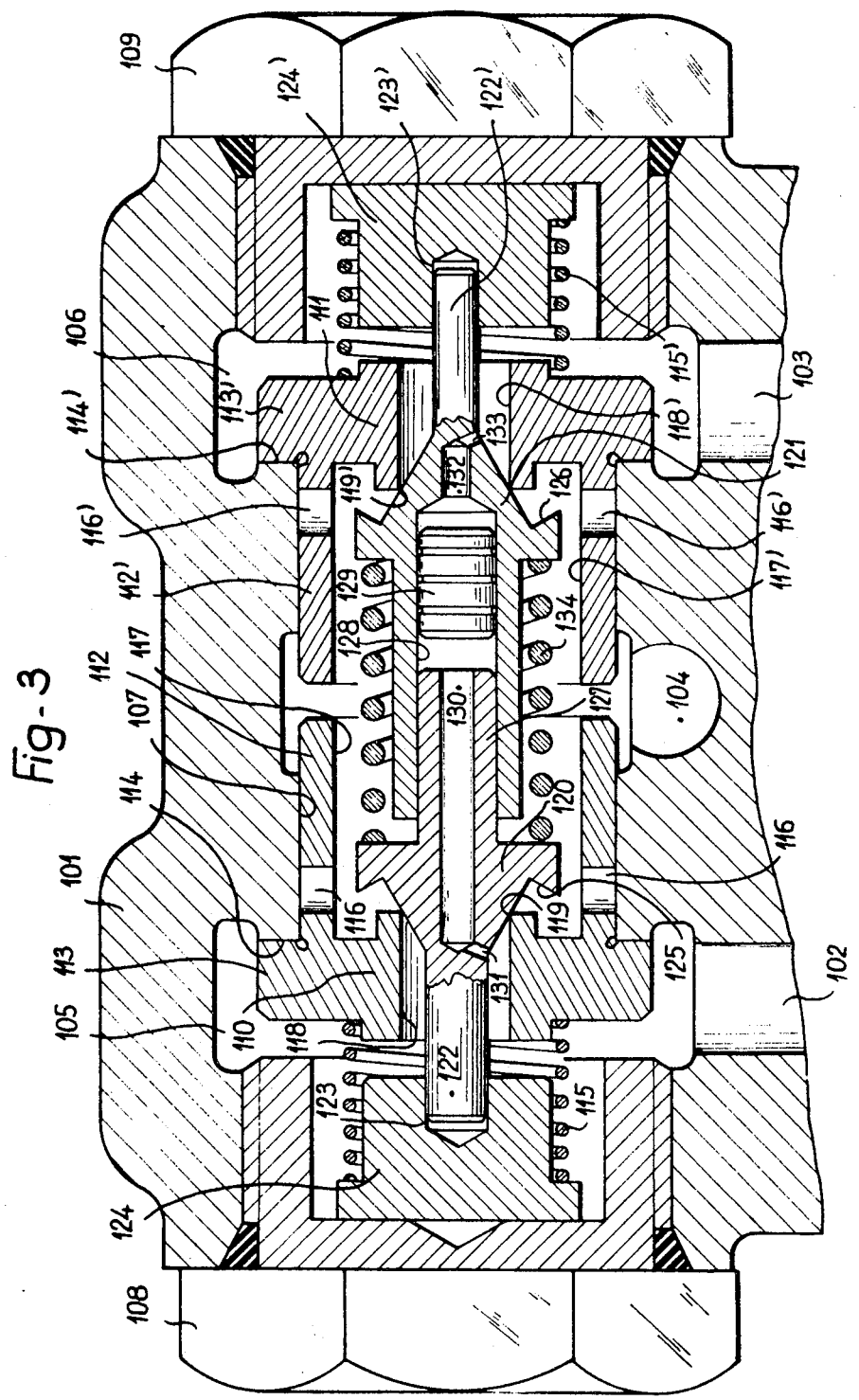
FIG. 3 illustrates in section a device according to this invention.

As shown in FIGS. 2 and 3, the valve device comprises a casing 101 adapted to be secured to a cover or to the timing plate of the pump to which it is connected. This casing comprises to this end a pair of input ports 102, 103. The casing 101 further comprises a port 104 connected to the compensating pump (not shown). These input ports 102, 103 open into two chambers 105 and 106, respectively, interconnected by a main bore 107. The aforesaid port 104 opens into the central portion of bore 107.

These chambers 105 and 106 open on the other hand to the outside and are closed by a pair of end plugs 108 and 109 provided w1th sealing gaskets.

The pair of refeed valves 110 and 111 are slidably mounted with a relativey substantial clearance in said main bore 107. They comprise each a cylindrical valve body 112, 112' guided in said bore 107 and formed with an end flange 113, 113' of a diameter greater than that of said bore 107. Each flange 113, 113' engages in a fluid-tight manner the shoulder 114, 114' formed between chambers 105, 106 of bore 107. The function of the body 112, 112' of the cylindrical valve is to prevent the flange 113, or 113' from taking a skew position. However, this valve body must be guided with a clearance sufficient to avoid any interference with the fluid-tight contact between said flanges 113, 113' and the corresponding shoulder 114, 114'. Each refeed valve is urged to its seated positon, i.e. against the shoulder 114 or 114', by a return spring 115, 115'. These springs 115, 115' react against the aforesaid plugs 108 and 109, respectively.

Each cylindrical valve body 112, 112' has one or more radial passages, holes or ports 116, 116' formed therethrough at a certain axial distance from the sealing face of flange 113, 113'. The function of these holes 116, 116' and the manner in which their axial position is determined will be explained presently.

Each cylindrical valve body 112, 112' comprises first and second concentric bores 117, 118 (117', 118') opening into each other and interconnected by an edge 119, 119'. The first bore 117, 117' has a diameter greater than that of bore 118, 118', the latter opening into chambers 105, 106. The aforesaid edges 119, 119' constitute the seats of a pair of discharge valves 120, 121 adapted to engage these seats through tapered body portions.

At their ends adjacent the plugs 108, 109 these discharge valves comprise cylindrical guide rods or shanks 122, 122' of a diameter considerably smaller than that of bores 118, 118'.

Each guide rod 122, 122' slidably engages a blind hole 123, 123' formed in an abutment member 124, 124' reacting against the bottom of plug 108, 109. These members 124, 124' are urged by return springs 115, 115' against the corresponding plug 108, 109 in which they are centered with a considerable clearance. When the discharge valves 120, 121 engage their seats 119, 119', their fluid-tightness cannot be impaired by any external stress for the assembly comprising the guide rod 122, 122' and abutment member 124, 124' is positioned automatically. Each discharge valve 120, 121 comprises a deflector portion 125, 126 adapted to deviate the fluid jet escaping between the valve and its seat when the valve 1s unseated. This known contrivance, notably in the specific case of monitored discharge valves, is advantageous in that it prevents the pressure from varying appreciably with the fluid output.

The discharge valve 120 comprises a cylindrical guide rod 127 slidably mounted with a moderate clearance in a bore 128 formed in the opposite discharge valve 121. This bore 128 has a smaller diameter than the edge seats 119, 119' and has fitted therein a separating valve 129. The volume left between this separating valve 129 and the adjacent end of cylindrical guide rod 127 communicates with chamber 105 through passages 130 and 131 formed in said discharge valve 120. Similarly, the volume left between said separating valve 129 and the adjacent end of bore 128 of discharge valve 121 communicates with chamber 106 via passages 132 and 133 formed in said discharge valve 121.

The above-described valve device operates as follows:

I - When the pressure rises in the inlet port 102 the refeed valve 110 is seated against shoulder 114 and the pressure exerted on discharge valve 120 is equal to the pressure differential in bores 118 and 128, i.e. to the product of the cross-sectional area of bore 118 by the pressure force exerted in said port 102, minus the product of the cross-sectional area of bore 128 by the same pressure force; this equality may be expressed as follows:

$$F(120) = P(102)[S(118) - S(128)]$$

The function of separating valve 129 is to prevent the fluid from flowing from chamber 105 to chamber 106 through passages 131, 130, 132 and 133. The spring 134 urges discharge valve 120 against its seat 119 while urging the other discharge valve 121 against 1ts seat 119' since the pressure in port 103 and chamber 106 is substantially lower.

In this position, the flange 113' of refeed valve 111 is unseated from shoulder 114' since the effort exerted by spring 134 on discharge valve 121 is greater than the effort exerted on valve 111 by the relatively low pressure prevailing in chamber 106.

According to a specific feature characterizing this invention the radial passages 116' of valve 111, in the above-defined position, remain closed by the wall of bore 107, i.e. no communication is established between bore 177' and said chamber 106. In this case, it is assumed that the pressure in chamber 106 and port 103 approximates the compensating pressure prevailing in port 104.

When the pressure in chamber 106 and port 103 drops considerably below the compensating pressure, the refeed valve 111 is moved to the right, as seen in FIG. 3, thus uncovering the radial passages 116' and permitting the fluid communication between port 104 and chamber 106.

In case of sudden reversal of the pressures, i.e. if chamber 105 is at low pressure and chamber 106 at high pressure, no appreciable leakage takes place between port 103 and bore 117. In fact, the passages 116' are covered by the bore 107 due to the force of spring 115' before the pressure differential between ports 104 and 103 has dropped to zero value. Thus, when the pressure in port 103 has risen slightly the flange 113' of valve 111 engages the relevant shoulder 114'.

If the diameter of bore 118' differs from that of bore 118, it is a sample matter to obtain different gauged pressures for the two discharge valves 120 and 121. Different gauging pressures may also be obtained by providing holes 123, 123' of different depths. Under these conditions it will be seen that, according to the pressure prevailing in chambers 107 or 105, the length and force of spring 134 vary. Thus, for instance, the depth of holes 123, 123' may be adjusted (to permit the proper setting of the discharge pressures of valves 120 and 121) by using means adapted to control the members 124, 124' through the end plugs 108, 109.

Between the guide rods 122, 122' and the blind holes 123, 123' a certain clearance is provided for producing a certain damping effect in the closing movements of the discharge valves. Similarly, if the holes 131 and 133 have a sufficiently small diameter, a certain damping effect may be introduced into the opening movement of said discharge valves. Finally, it will be noted that the separating valve 129 may consist of a simple ball adapted to close either bore 130 or bore 132.

II - When the pressure in chamber 105 rises to a value corresponding to the discharge pressure, the discharge valve 120 is opened so that hydraulic fluid will flow against the deflector 125. The cross-sectional passage areas between this deflector 125 and the relevant bore 117, and between the spring 134 and the same bore 117, must be sufficient to minimize pressure losses. The fluid released by discharge valve 120 opens the refeed valve 111 and flows into chamber 106.

If all the passages and conduits are designed with adequate oversize to keep the total pressure loss downstream of discharge valve 120 at a value below the compensating pressure, the fluid flowing out from port 104 will be mixed up with the fluid released by the unseated discharge valve 120, and the value of the pressure built up in chamber 106 will safely prevent any cavitation effect in the circuit.

From the foregoing it is clear that the refeed and discharge valve device described herein constitutes an advantageous substitute for the hitherto known valve and pipe-line systems.

Now it will be assumed that the refeed and discharge device is incorporated in a hydrostatic transmission in which suitable control means constantly keep the circuit pressure at a value inferior to the discharge pressure. The fluid output flowing under these conditions around the discharge valves in case of hydraulic beats,- surges or hammering too rapid to permit their proper detection,is constantly very low. It is therefore unnecessary to provide discharge valves and refeed valves having dimensions calculated according to the maximum output of the hydrostatic transmission. The device of this invention is particularly advantageous in that it takes due account of this remark.

What is claimed as new is:

1. Device for refeeding and discharging the hydraulic circuits of a hydrostatic transmission, which comprises a pair of discharge valves, a pair of refeed valves and a pair of ports connected to the main pipe lines of the transmission, respectively, and opening into fluid chambers communicating with said valves, characterized in that said chambers disposed at the opposite ends of a main bore connected to a compensating pump constitute with said bore a pair of shoulders engageable by said refeeding valves, each refeed valve comprising a seat-forming flange engaging one of said shoulders, said refeed valves further comprising axially aligned first and second bores interconnecting the ends of said valves, the first bore of greater diameter than the second bore having its opening directed towards said main bore, at least one radial passage being further provided for connecting said first bore to the outer surface of a sliding member guiding said refeed valve in said main bore; each one of said discharge valves, disposed coaxially within said refeed valves, engaging a seat consisting of the intersection edge formed between said first and second bores, and being urged against said seat by a common spring disposed between said discharge valves, stop means limiting the axial movements of said discharge valves in the closing direction thereof whereby when one of said discharge valves is seated under the force of said common spring the refeed valve is moved away from the corresponding shoulder and the radial passage is closed by said main bore.

2. Device according to claim 1, characterized in that one discharge valve has an integral cylindrical guide portion movable in a bore formed in the other discharge valve.

3. Device according to claim 2, characterized in that the volume bound by said cylindrical guide portion and said bore is connected to the fluid chambers communicating with said valves, respectively, through passages formed in said cylindrical guide portion and said other discharge valve, said volume being divided by a valve member slidably fitted in said bore so as to isolate hydraulically said passages from each other, the diameter of said bore being smaller than that of the seats of said discharge valves.

4. Device according to claim 1 characterized in that said discharge valves comprise a fluid 1, deflector member of a type known per se.

5. Device according to claim 1, characterized in that the seats of said discharge valves have different diameters.

6. Device according to claim 1, characterized in that the position of axial abutment members of said discharge valves differs and/or is adjustable for each one of said valves.

7. Device according to claim 6, characterized in that the axial abutment member of said discharge valves is located within a plug closing the chambers in which the pressure of the transmission pipe line is exerted, and that a sliding clearance is provided between a guide rod and a hole receiving same, which is filled with hydraulic fluid.

8. Device according to claim 1, characterized in that it is incorporated in the timing plate or cover of a hydraulic pump or motor which are formed with inlet and outout ports for said fluid.

* * * * *